US012433661B2

(12) United States Patent
Cui et al.

(10) Patent No.: US 12,433,661 B2
(45) Date of Patent: Oct. 7, 2025

(54) DATA ADJUSTMENT METHOD IN RADIO FREQUENCY OPERATION, AND RADIO FREQUENCY HOST

(71) Applicant: HANGZHOU BRONCUS MEDICAL CO., LTD., Zhejiang (CN)

(72) Inventors: Changjie Cui, Zhejiang (CN); Hong Xu, Zhejiang (CN)

(73) Assignee: HANGZHOU BRONCUS MEDICAL CO., LTD., Hangzhou (CN)

( * ) Notice: Subject to any disclaimer, the term of this patent is extended or adjusted under 35 U.S.C. 154(b) by 503 days.

(21) Appl. No.: 17/955,984

(22) Filed: Sep. 29, 2022

(65) Prior Publication Data
US 2023/0029103 A1 Jan. 26, 2023

Related U.S. Application Data

(63) Continuation of application No. PCT/CN2021/072956, filed on Jan. 20, 2021.

(30) Foreign Application Priority Data

Dec. 31, 2020 (CN) .......................... 202011638301.9

(51) Int. Cl.
*A61B 18/12* (2006.01)
*A61B 18/00* (2006.01)
(52) U.S. Cl.
CPC .............. *A61B 18/12* (2013.01); *A61B 18/00* (2013.01); *A61B 2018/00702* (2013.01); *A61B 2018/00791* (2013.01); *A61B 2018/00875* (2013.01)
(58) Field of Classification Search
CPC .............................................. A61B 18/00–14
See application file for complete search history.

(56) References Cited

U.S. PATENT DOCUMENTS 5,423,808 A * 6/1995 Edwards ................ A61B 18/12
606/34
5,540,684 A * 7/1996 Hassler, Jr. ........ A61B 18/1206
606/51
(Continued)

FOREIGN PATENT DOCUMENTS

CN 1596085 A 3/2005
CN 108784829 A 11/2018
(Continued)

OTHER PUBLICATIONS

International Search Report in corresponding International Application No. PCT/CN2021/072956, mailed Sep. 28, 2021.

*Primary Examiner* — Gennadiy Tsvey

(57) ABSTRACT

Disclosed are a data adjustment method in a radio frequency operation and a radio frequency host. The data adjustment method includes acquiring set power data corresponding to the radio frequency operation, setting an output power of a radio frequency signal according to the set power data, and outputting the radio frequency signal to an object of the radio frequency operation; detecting physical characteristic data of the object in real time, and determining whether the physical characteristic data exceeds a preset range; adjusting the radio frequency output power when the physical characteristic data exceeds the preset range; and adjusting the preset range according to the physical characteristic data detected in real time in a preset period of time before a present moment when the physical characteristic data does not exceed the preset range. As a result, the safety and success rate of the radio frequency operation is improved.

14 Claims, 4 Drawing Sheets

(56) References Cited

U.S. PATENT DOCUMENTS

| | | | | |
|---|---|---|---|---|
| 5,558,672 A * | 9/1996 | Edwards | A61B 18/1485 | 606/41 |
| 5,660,836 A * | 8/1997 | Knowlton | A61M 15/0036 | 607/101 |
| 5,931,836 A * | 8/1999 | Hatta | A61B 18/1206 | 606/45 |
| 5,971,980 A * | 10/1999 | Sherman | A61B 18/1492 | 606/41 |
| 6,135,999 A * | 10/2000 | Fanton | A61B 18/148 | 606/45 |
| 6,162,216 A * | 12/2000 | Guziak | A61B 18/1482 | 606/42 |
| 6,280,441 B1 * | 8/2001 | Ryan | A61B 18/148 | 606/41 |
| 6,383,183 B1 * | 5/2002 | Sekino | A61B 18/1206 | 606/49 |
| 6,409,722 B1 * | 6/2002 | Hoey | A61B 18/18 | 606/41 |
| 7,172,591 B2 * | 2/2007 | Harano | A61B 18/12 | 606/49 |
| 10,576,280 B2 * | 3/2020 | Claude | A61N 1/36014 | |
| 10,617,463 B2 * | 4/2020 | McHenry | A61B 18/1445 | |
| 2004/0006337 A1 * | 1/2004 | Nasab | A61B 18/1206 | 606/41 |
| 2006/0100620 A1 * | 5/2006 | Daniel | A61B 18/1477 | 606/49 |
| 2006/0287649 A1 | 12/2006 | Ormsby et al. | | |
| 2008/0255642 A1 * | 10/2008 | Zarins | A61N 5/0601 | 607/99 |
| 2012/0123400 A1 * | 5/2012 | Francischelli | A61B 18/12 | 606/41 |
| 2015/0289930 A1 * | 10/2015 | Elgaard | A61B 18/1492 | 606/40 |
| 2015/0320480 A1 * | 11/2015 | Cosman, Jr | A61B 18/16 | 606/34 |
| 2016/0038228 A1 * | 2/2016 | Daniel | A61B 18/1477 | 606/40 |
| 2017/0105783 A1 * | 4/2017 | Highsmith | A61B 18/1492 | |
| 2017/0143401 A1 * | 5/2017 | Woloszko | A61B 18/1206 | |
| 2017/0209208 A1 * | 7/2017 | Govari | A61B 18/1206 | |
| 2017/0238991 A1 * | 8/2017 | Worrell | H05K 1/034 | |
| 2017/0245917 A1 * | 8/2017 | Sugawara | A61B 18/12 | |
| 2018/0140346 A1 * | 5/2018 | Legaspi | A61B 5/053 | |
| 2020/0022747 A1 * | 1/2020 | Zilberman | A61B 18/1206 | |
| 2020/0352635 A1 * | 11/2020 | Batchelor | A61B 18/1442 | |
| 2022/0202471 A1 * | 6/2022 | Schepis | A61B 18/1492 | |
| 2022/0249162 A1 * | 8/2022 | Benedikt | A61B 18/1815 | |

FOREIGN PATENT DOCUMENTS

| | | | | |
|---|---|---|---|---|
| CN | 109589169 A * | 4/2019 | | A61B 18/1492 |
| CN | 111214288 A | 6/2020 | | |

* cited by examiner

DATA ADJUSTMENT METHOD IN RADIO FREQUENCY OPERATION, AND RADIO FREQUENCY HOST

CROSS REFERENCE OF RELATED APPLICATIONS

This application is a continuation of International Patent Application No. PCT/CN2021/072956, filed on Jan. 20, 2021, which claims priority of Chinese Patent Application No. 202011638301.9, filed on Dec. 31, 2020, the entire contents of which are hereby incorporated by reference in their entities.

TECHNICAL FIELD

Embodiments of the present invention relate to the field of electronic technology, and particularly to a data adjustment method in a radio frequency operation and a radio frequency host.

BACKGROUND

In the radio frequency technology, a radio frequency operation is performed by accurately applying radio frequency energy to an object by a radio frequency host under the guidance of an image. In the radio frequency operation, the operation effect needs to be ensured, while care is taken to protect the object and operator from damage and injury.

In the prior art, during the operation of the radio frequency host, since the physical characteristics of the object keeps changing due to the action of radio frequency energy, safety problems will be caused to the objects or operation device or the radio frequency operation effect is caused to be unsatisfactory, if constant parameters are used to carry out the radio frequency operation.

SUMMARY

An embodiment of the present application provides a data adjustment method in a radio frequency operation and a radio frequency host. During the radio frequency operation, the radio frequency output power or a preset range for physical characteristic data of an object of the radio frequency operation is adjusted to improve the safety and effectiveness of radio frequency operation.

In an aspect, an embodiment of the present application provides a data adjustment method in a radio frequency operation, which includes steps of: acquiring set power data corresponding to a radio frequency operation, setting an output power of a radio frequency signal according to the set power data, and outputting the radio frequency signal to an object of the radio frequency operation; detecting physical characteristic data of the object in real time, and determining whether the physical characteristic data exceeds a preset range; adjusting the radio frequency output power when the physical characteristic data exceeds the preset range; and adjusting the preset range according to the physical characteristic data detected in real time in a preset period of time before a present moment when the physical characteristic data does not exceed the preset range.

In an aspect, an embodiment of the present application also provides a radio frequency host, which includes an acquisition module, configured to acquire set power data corresponding to a radio frequency operation; a transmitting module, configured to set an output power of a radio frequency signal according to the set power data, and output the radio frequency signal to an object of the radio frequency operation; a detection module, configured to detect physical characteristic data of the object in real time, and determine whether the physical characteristic data exceeds a preset range; and an adjustment module, configured to adjust the radio frequency output power when the physical characteristic data exceeds the preset range, and adjust the preset range according to the physical characteristic data detected in real time in a preset period of time before a present moment when the physical characteristic data does not exceed the preset range.

In an aspect, an embodiment of the present application also provides a radio frequency host, which includes a storage and a processor, wherein the storage stores an executable program code; and the processor is coupled to the storage, and configured to call the executable program code stored in the storage, and implement the data adjustment method in a radio frequency operation as described above.

As can be known from the above embodiments of the present application, set power data corresponding to a radio frequency operation is acquired, an output power of a radio frequency signal is set according to the set power data, and the radio frequency signal is outputted physical characteristic data of an object of the radio frequency operation is detected in real time during the radio frequency operation, and whether the physical characteristic data exceeds a preset range is determined, wherein if the physical characteristic data exceeds the preset range, the radio frequency output power is adjusted, to reduce the risk of the radio frequency operation damaging the object and improve the safety of the radio frequency operation; and if the physical characteristic data does not exceed the preset range, the preset range of the physical characteristic data is adjusted, and the reasonableness of the preset range is automatically updated, to provide a more accurate data basis for subsequent radio frequency operations, and improve the reasonableness and success rate of the radio frequency operation.

BRIEF DESCRIPTION OF THE DRAWINGS

In order to describe the technical solutions according to the embodiments of the present invention or in the prior art more clearly, the drawings needed to be used in the embodiments or in the prior art will be described briefly below. Apparently, the drawings in the following description show some embodiments of the present application. Other drawings can be obtained by persons of ordinary skill in the art based on these drawings without creative efforts.

DESCRIPTION OF THE EMBODIMENTS

In order to make the objects, technical solutions and advantages of the embodiments of the present invention clearer, the technical solutions according to the embodiments of the present invention will be clearly and completely described with reference to drawings in the embodiments of the present invention. Apparently, the embodiments described are merely some embodiments, but not all of the embodiments of the present application. All other embodiments obtained by ordinary persons skilled in the art based on the embodiments of the present invention without creative efforts shall fall within the protection scope of the present invention.

Figure 1:
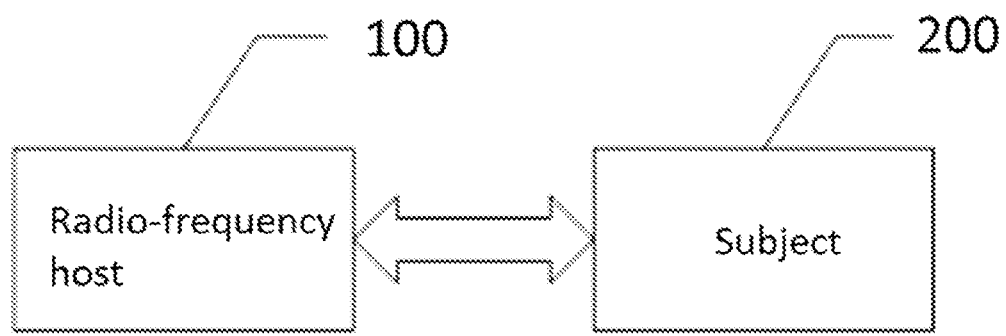
FIG. 1 is a schematic diagram showing an application scenario of a data adjustment method in a radio frequency operation provided in an embodiment of the present application.

Referring to FIG. 1, a schematic diagram showing an application scenario of a data adjustment method in a radio frequency operation provided in an embodiment of the present application. The data adjustment method in a radio frequency operation includes, during the radio frequency operation, outputting a radio frequency signal at a set power, detecting physical characteristic data of an object of the radio frequency operation in real time, and determining whether to adjust the radio frequency output power or the physical characteristic data according to the change of the physical characteristic data. As a result, the data of the radio frequency operation tends to be more reasonable, to improve the success rate and safety of the radio frequency operation.

Particularly, an implementation body of the data adjustment method is a radio frequency host that may be specifically a radio frequency ablation instrument or other devices. As shown in FIG. 1, a radio frequency host 100 is connected to an object 200, and then a radio frequency operation is started, in which the radio frequency host 100 transmits a radio frequency signal to the object 200 by a radio frequency generator. In the radio frequency operation, as the nature of the object 200 changes, physical characteristic data also changes. The object 200 can be any object that needs the radio frequency operation. For example, when the radio frequency host 100 is a radio frequency ablation instrument, the object 200 can be an organism with abnormal tissues in the body that needs to be ablated.

The radio frequency host 100 has an input interface that can be externally connected to a movable storage such as U disk, or externally connected to an input device such as keyboard and mouse, to read data from the removable storage or acquire data inputted by a user from the input device. The radio frequency host 100 may also be connected to a server over a network, to obtain, from the server, big data from all radio frequency hosts connected to the server, wherein the big data includes various historical data related to the radio frequency operation.

Figure 2:
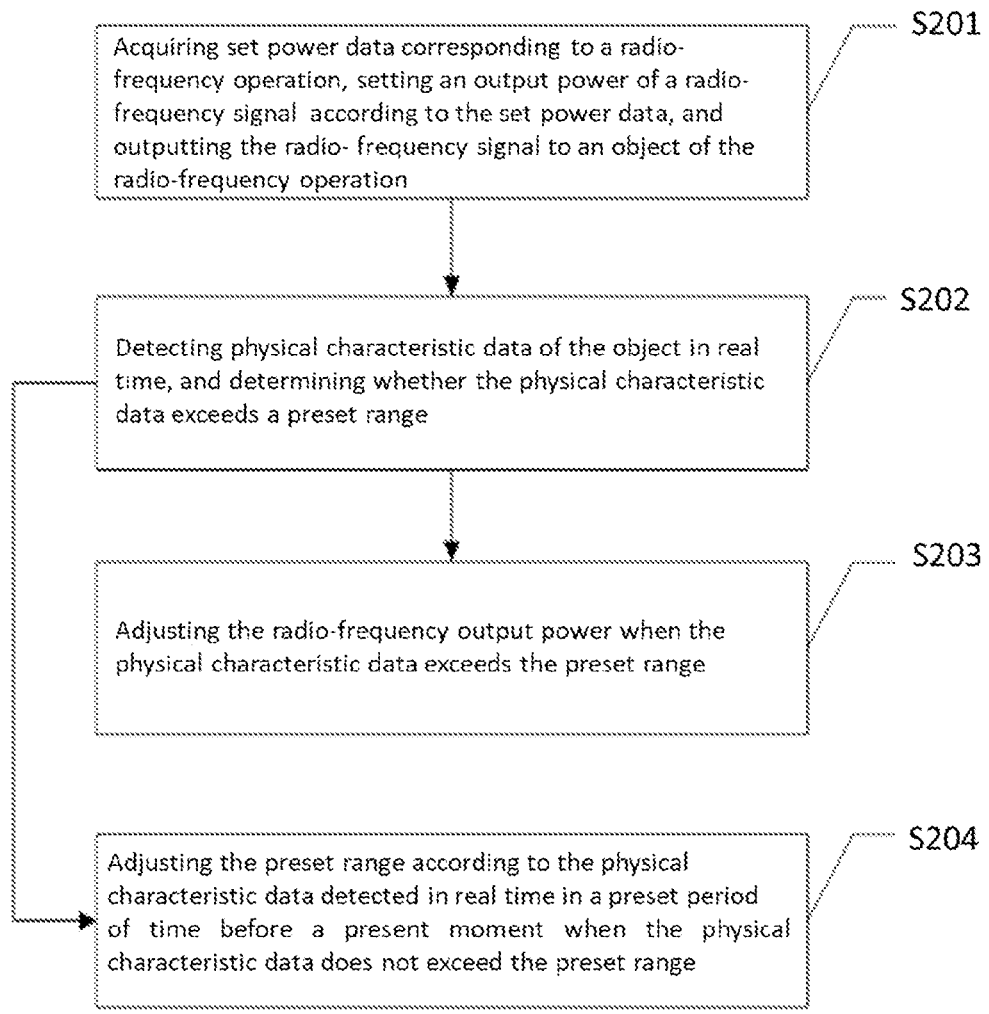
FIG. 2 is a schematic flow chart of a data adjustment method in a radio frequency operation provided according to an embodiment of the present application.

FIG. 2 is a schematic flow chart of a data adjustment method in a radio frequency operation provided in an embodiment of the present application. The method is applicable to the radio frequency host as shown in FIG. 1. As shown in FIG. 2, the method specifically includes following steps.

Step S201: acquiring set power data corresponding to a radio frequency operation, setting an output power of a radio frequency signal according to the set power data, and outputting the radio frequency signal to an object of the radio frequency operation.

Particularly, the set power data can be obtained by obtaining, from a server, historical radio frequency operation data of all radio frequency hosts in a network, or obtained from set data input into the radio frequency host by a user.

Step S202: detecting physical characteristic data of the object in real time, and determining whether the physical characteristic data exceeds a preset range,
wherein the physical characteristic data includes the temperature and impedance of the object.

In the radio frequency operation, the radio frequency signal outputted on the object has radio frequency energy, and the physical characteristic data of a site receiving the radio frequency operation will change under the action of the radio frequency energy, The preset range is a numerical interval defined by a minimum value and a maximum value, and the way of obtaining the minimum value and the maximum value is the same as the way of obtaining the set power data in Step S201. That is, the minimum value and the maximum value can be obtained by obtaining, from a server, historical radio frequency operation data of all radio frequency hosts in a network, or obtained from set data input into the radio frequency host by a user.

Step S203: adjusting the radio frequency output power if the physical characteristic data exceeds the preset range.

If the physical characteristic data is greater than the maximum value of the preset range or less than the minimum value of the preset range, it is determined to exceed the preset range. Then, the radio frequency output power is adjusted, to reduce or increase the physical characteristic data.

In this embodiment, the calculation of the actual power detected in real time requires the measurement of the corresponding voltage and current, and then the real-time power is calculated according to a product of the voltage and current.

Step S204: adjusting the preset range according to the physical characteristic data detected in real time in a preset period of time before the present moment if the physical characteristic data does not exceed the preset range.

If the physical characteristic data does not exceed the preset range, the preset range is adjusted according to the physical characteristic data detected in real time in a preset period of time before the present moment. The adjusted physical characteristic data can be used as historical radio frequency operation data, set as a data basis for a preset range of the physical characteristic data of a next radio frequency operation, thus making the data be of great referential value, and improving the accuracy of the radio frequency operation.

In the embodiments of the present application, set power data corresponding to a radio frequency operation is acquired, an output power of a radio frequency signal is set according to the set power data, and the radio frequency signal is outputted, physical characteristic data of the object of the radio frequency operation is detected in real time during the radio frequency operation, whether the physical characteristic data exceeds a preset range is determined, wherein if the physical characteristic data exceeds the preset range, the radio frequency output power is adjusted, to reduce the risk of the radio frequency operation damaging the object and improve the safety of the radio frequency operation; and if the physical characteristic data does not exceed the preset range, the preset range of the physical characteristic data is adjusted, and the preset range is automatically adapted according to the reasonableness, to provide a more accurate data basis for subsequent radio frequency operations, and improve the reasonableness and success rate of the radio frequency operation.

Figure 3:
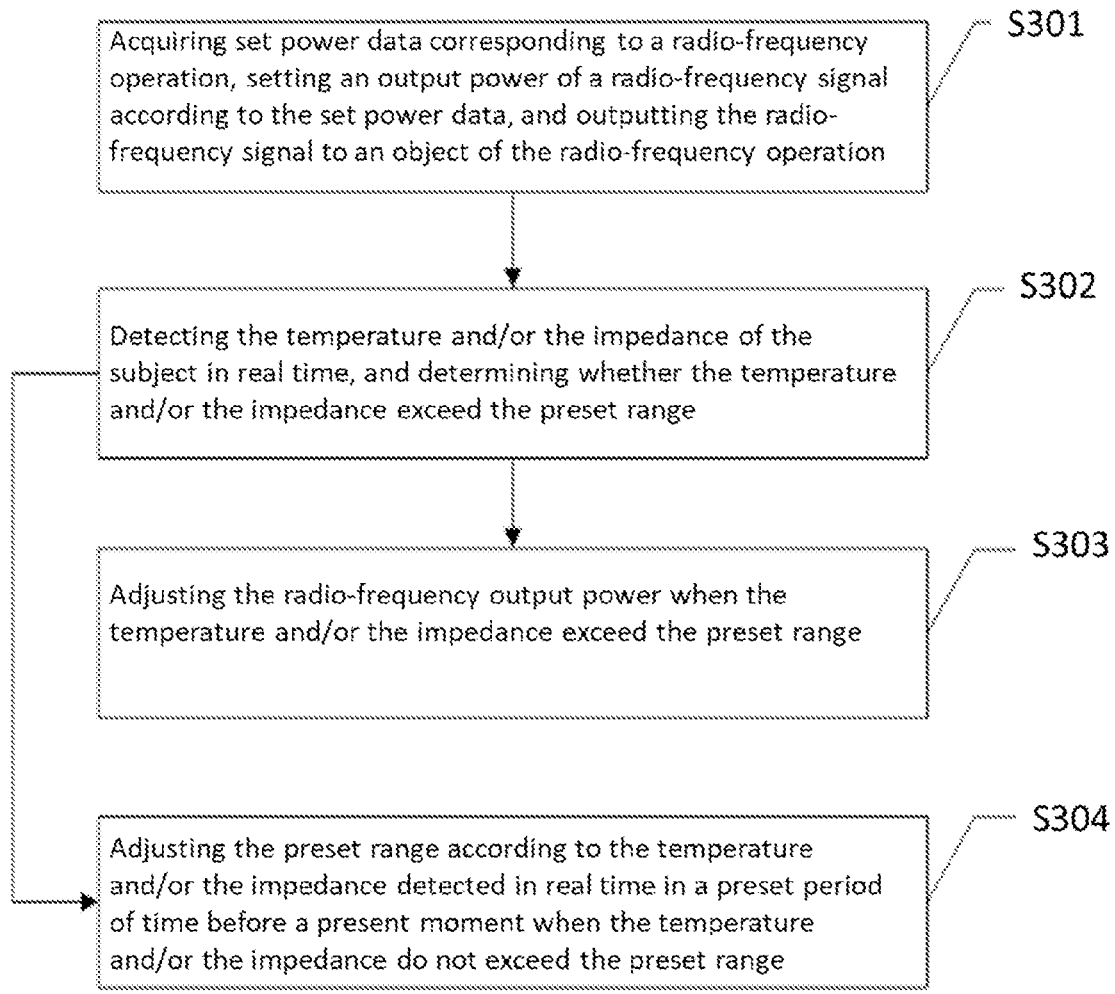
FIG. 3 is a schematic flow chart of a data adjustment method in a radio frequency operation provided according to another embodiment of the present application.

FIG. 3 is a schematic flow chart of a data adjustment method in a radio frequency operation provided in another embodiment of the present application. The method is applicable to the radio frequency host as shown in FIG. 1. As shown in FIG. 3, the method specifically includes following steps.

Step S301: acquiring set power data corresponding to a radio frequency operation, setting an output power of a radio frequency signal according to the set power data, and outputting the radio frequency signal to an object of the radio frequency operation.

Particularly, the set power data can be obtained through the following two manners.

In a first manner, historical radio frequency operation data corresponding to the task and object of the radio frequency operation is obtained from a server. Then the historical radio frequency operation data is classified according to the task of the radio frequency operation and the nature of the object. For example, the historical radio frequency operation data of task No. 1 performed on object A is classified into one category, the historical radio frequency operation data of task No. 2 performed on object is A is classified into one category, the historical radio frequency operation data of task No. 1 performed on object is B is classified into one category, and the like. Because of the same task, and the same nature of the object, the corresponding relationship between each category of historical radio frequency operation data and the radio frequency operation time is also the same.

Therefore, when the radio frequency operation is performed, radio frequency power data of corresponding historical radio frequency operation data is acquired based on the task and object of the current radio frequency operation, the acquired radio frequency power data is used as the set power data, the output power of the radio frequency signal in various periods of time of the radio frequency operation is set according to the corresponding relationship between the set power data and the radio frequency operation time, and the radio frequency signal having the output power is outputted to the object. Particularly, the output power of the radio frequency signal in the historical radio frequency operation data is determined as the set power data, wherein the set power data is specifically a change trend curve representing the corresponding relationship between the radio frequency operation time and the output power. From the change trend curve, the output power at an operation time corresponding to the current stage of the current radio frequency operation is acquired, and the acquired output power is set as the output power of the radio frequency signal.

In a second manner, the set power data can be obtained from the set data input into the radio frequency host by a user. Particularly, the set power data is acquired from the set data in the removable storage connected to the radio frequency host, or the set power data is acquired from the set data inputted via an input device of the radio frequency host. The set power data is a numerical interval including a maximum value of the set power and a minimum value of the set power.

A median value of the numerical interval is set as the output power of the radio frequency signal. The radio frequency signal having the output power is outputted to the object.

Step S302: detecting the temperature and/or the impedance of the object in real time, and determining whether the temperature and/or the impedance exceed the preset range.

Step S303: adjusting the radio frequency output power if the temperature and/or the impedance exceed the preset range.

Particularly, the radio frequency output power can be adjusted as follows. If either of the temperature or the impedance of the object detected in real time is greater than the maximum value of the preset range, the output power of the radio frequency signal is reduced to a preset first target power; and if both the temperature and the impedance of the object detected in real time are less than the minimum value of the preset range, the output power of the radio frequency signal is increased to a preset second target power.

Due to the high temperature generated by the radio frequency energy, the impedance of the site of the object receiving the radio frequency operation is caused to increase. Accordingly, if the temperature and/or the impedance of the object detected in real time exceed the preset range, the temperature and/or the impedance generally are greater than the maximum value of the preset range, then the output power of the radio frequency signal is reduced to the preset first target power, If the temperature and/or the impedance of the object detected still exceed the preset range, the output power of the radio frequency signal is further reduced to a next target power lower than the first target power. The target power for each reduction is preset in the radio frequency host.

If a radio frequency probe provided on the radio frequency host is a multi-electrode radio frequency probe, the radio frequency output power may be adjusted as follows. If the temperature or the impedance of the object detected in real time is greater than the maximum value of the preset range, the total power needed to be set is determined according to the minimum impedance of each electrode of the multi-electrode radio frequency probe, and the real-time total power of the radio frequency probe of the radio frequency host is detected. The power adjustment amount is calculated by the default proportional integral differential (PID) algorithm according to the total power needed to be set and the real-time total power, and the target power is calculated according to the power adjustment amount and the current output power of the radio frequency signal. Then, the radio frequency output power is reduced to the target power.

Particularly, the impedances of multiple electrodes of the multi-electrode radio frequency probe are detected, and an individual electrode with the smallest impedance is determined. According to the impedance of the individual electrode, the preset power of the individual electrode, and the impedances of other electrodes of the multi-electrode radio frequency probe than the individual electrode, the powers of other electrodes are calculated, and the sum of the power of each electrode is taken as the total power needed to be set.

The power calculation formula is $P=U^2/R$. Since each electrode of the multi-electrode radio frequency probe is connected to the same voltage output, and each electrode has the same voltage at the site of the radio frequency operation. The power of each electrode depends on the impedance R, and the power P increases with the decrease of R. The power of each individual electrode is delimited by the set total power, and can be equal to, but cannot exceed the set total power. The set total power is the sum of the power of each electrode.

Particularly, the total power needed to be set currently is calculated according to the impedance of the electrode;

According to the formula $P=U^2/R$, it can be deduced that the relationship between the power $P_{lim}$ of the electrode with the smallest impedance and the power $P_n$ of other individual electrodes is:

$$\frac{P_{lim}}{P_n} = \frac{U^2/R_{lim}}{U^2/R_n} = \frac{R_n}{R_{lim}}, \text{ that is, } P_n = \frac{P_{lim}R_{lim}}{R_n}.$$

$P_{lim}$ is the power of the known electrode with the smallest impedance, and according to $R_{lim}$ and the impedances $R_n$ of other individual electrodes, $P_n$ corresponding to each individual electrode can be obtained. The total power P needed to be set is calculated by the formula $$P = \sum_{i=1}^{n} P_i.$$

According to the currently measured real-time total power and the total power P needed to be set, the total power increment ΔP can be obtained according to the PID algorithm. The PID algorithm is accomplished by $$u(k) = K_P\{err(k) + \frac{T}{T_I}\sum_{j=0}^{k}err(j) + \frac{T_D}{T}[err(k) - err(k-1)]\}; \text{ or} \quad \text{Formula 1}$$

$$u(k) = K_P err(k) + K_I\sum_{j=0}^{k}err(j) + K_D[err(k) - err(k-1)]; \quad \text{Formula 2}$$

wherein $K_P$, $K_I = K_P\frac{T}{T_I}$, and $K_D = K_P\frac{T_D}{T}$ are respectively the proportional coefficient, integral coefficient and differential coefficient of the PID algorithm, T is the sampling time, $T_I$ is the integration time (also referred to as the integral coefficient), $T_D$ is the differential time (also referred to as the differential coefficient), err(k) is the difference between the total power needed to be set and the real-time total power, and err(k) is the output.

By using the incremental PID algorithm ΔP=u(k)−u(k−1), it can be obtained from Formula 2 above:

ΔP=$K_p$[err(k)−err(k−1)]+$K_I$err(k)+$K_D$[err(k)−2err(k−1)+err(k−2)]

The output adjustment is calculated according to ΔP, and the adjustment has a one-to-one mapping relationship with ΔP, because the power adjustment is achieved by controlling a voltage signal from a power board, the output voltage corresponds to an input digital signal of a digital-to-analog converter, and the adjustment amount actually corresponds to this digital signal. The mapping relationship enables a corresponding relationship between the output and ΔP, for example, the output of 1 means that the corresponding power increment ΔP is 0.1 w. In this way, the control of ΔP is achieved according to the mapping relationship.

The current power is increased by a value of ΔP to obtain the target power. When ΔP is a negative value, the increment ΔP means to reduce the radio frequency output power, to lower the temperature. Otherwise, when ΔP is a positive value, it means to increase the radio frequency output power, to increase the temperature.

The radio frequency output power is adjusted to the target power and then outputted.

If the temperature or the impedance of the object detected in real time is less than the minimum value of the preset range, the power is adjusted in the way of that has described above.

Step S304: adjusting the preset range according to the temperature and/or the impedance detected in real time in a preset period of time before a present moment if the temperature and/or the impedance does not exceed the preset range.

Particularly, according to the various temperatures and/or impedances detected in real time in the preset period of time, and a default selection algorithm, target values are selected from various temperatures and/or the impedances in the preset time to update the extreme values of the preset range, wherein the extreme values include a minimum and a maximum value.

More specifically, the preset period of time is 10 sec. Taking temperature value as an example, a minimum value among various temperature values in 10 seconds before the present moment is selected as the minimum value of the preset range, and a maximum value among various temperature values is selected as the maximum value of the preset range; Alternatively, a median value of various temperature values in 10 seconds before the present moment is calculated, and the to-be-updated extreme values corresponding to the median value is calculated according to the median value with reference to the difference between the median value and the extreme values of the preset range before updating, wherein calculated extreme values are the extreme values of the updated preset range.

In the embodiments of the present application, set power data corresponding to a radio frequency operation is acquired, an output power of a radio frequency signal is set according to the set power data, and the radio frequency signal is outputted, the temperature and impedance of an object of the radio frequency operation are detected in real time during the radio frequency operation, and whether the temperature and/or the impedance exceed a preset range is determined, wherein if the temperature or impedance is greater than the maximum value of the preset range, the output power of the radio frequency signal is reduced, to reduce the risk of the radio frequency operation damaging the object and improve the safety of the radio frequency operation; if the temperature and impedance are both lower than the minimum value of the preset range, the output power of the radio frequency signal is increased, to improve the effect of the radio frequency operation; and further, if the temperature and/or the impedance do not exceed the preset range, the preset range is automatically updated with reasonableness, to provide a more accurate data basis for subsequent radio frequency operations, and improve the reasonableness and success rate of the radio frequency operation.

Figure 4:
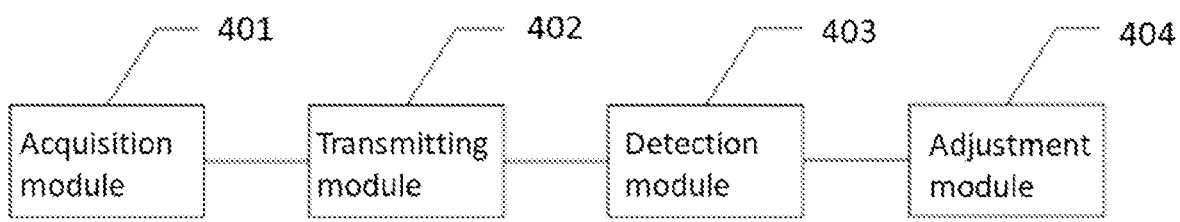
FIG. 4 is a schematic structural diagram of a radio frequency host provided in an embodiment of the present application.

FIG. 4 is a schematic structural diagram of a radio frequency host provided in an embodiment of the present application. For ease of description, only the parts relevant to the embodiments of the present application are shown. The radio frequency host is a radio frequency host for implementing the data adjustment method in a radio frequency operation described in the above embodiments. The radio frequency host includes:

an acquisition module 401, configured to acquire set power data corresponding to a radio frequency operation;

a transmitting module 402, configured to set an output power of a radio frequency signal according to the set power data, and output the radio frequency signal to an object of the radio frequency operation;

a detection module 403, configured to detect physical characteristic data of the object in real time, and determine whether the physical characteristic data exceeds a preset range; and an adjustment module 404, configured to adjust the radio frequency output power if the physical characteristic data exceeds the preset range, and the adjustment module 404 further configured to adjust the preset range according to the physical characteristic data detected in real time in a preset period of time before a present moment if the physical characteristic data does not exceed the preset range.

The various modules in the radio frequency host serve to implement the following functions. Set power data corresponding to a radio frequency operation is acquired, an output power of a radio frequency signal is set according to the set power data, and the radio frequency signal is outputted, physical characteristic data of the object of the radio frequency operation is detected in real time during the radio frequency operation, and whether the physical characteristic data exceeds a preset range is determined, wherein if the physical characteristic data exceeds the preset range, the radio frequency output power is adjusted, to reduce the risk of the radio frequency operation damaging the object and improve the safety of the radio frequency operation; if the physical characteristic data does not exceed the preset range, the preset range of the physical characteristic data is adjusted, and the preset range is automatically updated according to the reasonableness, to provide a more accurate data basis for subsequent radio frequency operations, and improve the reasonableness and success rate of the radio frequency operation.

Further, the detection module 403 is further configured to detect the temperature and/or the impedance of the object in real time.

Further, the adjustment module 404 is further configured to reduce the radio frequency output power to a preset first target power if the temperature or impedance of the object detected in real time is greater than the maximum value of the preset range; and increase the radio frequency output power to a preset second target power if the temperature and the impedance of the object detected in real time are both less than the minimum value of the preset range.

If a radio frequency probe provided on the radio frequency host is a multi-electrode radio frequency probe, the detection module 403 is further configured to determine the total power needed to be set according to the minimum impedance of the electrode of the multi-electrode radio frequency probe if the temperature or the impedance of the object detected in real time is greater than the maximum value of the preset range, and
- detect the real-time total power of the radio frequency probe of the radio frequency host; and
- the adjustment module 404 is further configured to calculate a power adjustment amount by default PID algorithm according to the total power needed to be set and the real-time total power, calculate a target power according to the power adjustment amount and the present output power of the radio frequency signal, and reduce the radio frequency output power to the target power.

The adjustment module 403 is also configured to select target values from various temperature values and/or impedance values to update extreme values of the preset range according to the various temperatures and/or the impedances detected in real time in the preset period of time and a default selection algorithm.

The acquisition module 401 is further configured to acquire historical radio frequency operation data corresponding to the task and object of the radio frequency operation; and determine the output power of the radio frequency signal in the historical radio frequency operation data as the set power data, wherein the set power data is a change trend curve representing the corresponding relationship between the radio frequency operation time and the output power.

The transmitting module 402 is further configured to acquire the output power in an operation time corresponding to the current stage of the current radio frequency operation, and set the acquired output power as the output power of the radio frequency signal.

The acquisition module 401 is further configured to acquire the set power data from an externally connected removable storage, or acquire the set power data inputted from an input device, wherein the set power data is a numerical interval including a maximum value of the set power and a minimum value of the set power.

The transmitting module 402 is further configured to set a median value of the numerical interval as the output power of the radio frequency signal.

In the embodiments of the present application, set power data corresponding to a radio frequency operation is acquired, an output power of a radio frequency signal is set according to the set power data, and the radio frequency signal is outputted, the temperature and the impedance of an object of the radio frequency operation is detected in real time during the radio frequency operation, and whether the temperature and/or the impedance exceed a preset range is determined, wherein if the temperature or the impedance is greater than the maximum value of the preset range, the radio frequency output power is reduced, to reduce the risk of the radio frequency operation damaging the object and improve the safety of the radio frequency operation; if the temperature and impedance are both lower than the minimum value of the preset range, the output power of the radio frequency signal is increased, to improve the effect of the radio frequency operation; and further, if the temperature and/or the impedance does not exceed the preset range, the preset range is automatically updated reasonably, to provide a more accurate data basis for subsequent radio frequency operations, and improve the reasonableness and success rate of the radio frequency operation.

Figure 5:
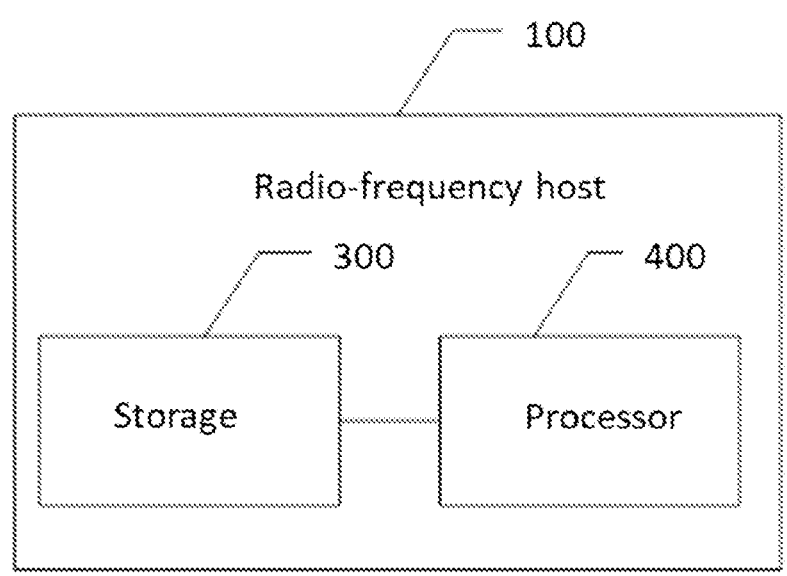
FIG. 5 is a schematic diagram showing a hardware structure in a radio frequency host provided in an embodiment of the present application.

Further, as shown in FIG. 5, an embodiment of the present application also provides a radio frequency host, which includes a storage 300 and a processor 400, wherein the processor 400 may be a central processor in the radio frequency host provided in the above embodiments. The storage 300 is, for example, hard drive storage, a non-volatile storage (such as flash memory or other storages that are used to form solid-state drives and are electronically programmable to confine the deletion, etc.), and a volatile storage (such as static or dynamic random access storage), which is not limited in the embodiments of the present application.

The storage 300 stores an executable program code; and the processor 400 is coupled to the storage 300, and configured to call the executable program code stored in the storage, and implement the data adjustment method in a radio frequency operation as described above.

Further, an embodiment of the present application further provides a computer-readable storage medium, which can be provided in the radio frequency host in each of the above embodiments, and may be the storage 300 in the embodiment shown in FIG. 5. A computer program is stored in the computer-readable storage medium, and when the program is executed by a processor, the data adjustment method in a radio frequency operation according to the embodiments shown in FIG. 2 and FIG. 3 is implemented. Further, the computer-readable storage medium may also be a U disk, a removable hard disk, a read-only storage (ROM, Read-Only Memory), RAM, a magnetic disk or an optical disk and other media that can store program codes.

In the above embodiments, emphasis has been placed on the description of various embodiments. Parts of an embodiment that are not described in detail may be found in the description of other embodiments.

The data adjustment method in a radio frequency operation and the radio frequency host provided in the present invention have been described above. Changes can be made to the specific implementation and the scope of the present application by those skilled in the art according to the idea of the embodiments of the present invention. Therefore, the disclosure of this specification should not be construed as a limitation of the present invention.

What is claimed is:

1. A data adjustment method in a radio frequency operation, comprising steps of:
   acquiring set power data corresponding to the radio frequency operation, setting an output power of a radio frequency signal according to the set power data, and outputting the radio frequency signal to an object of the radio frequency operation;
   detecting physical characteristic data of the object in real time, and determining whether the physical characteristic data exceeds a preset range that is a numerical interval defined by a minimum value and a maximum value by comparing the physical characteristic data with both the minimum value and the maximum value, wherein the physical characteristic data comprises a temperature and/or an impedance of the object;
   adjusting a radio frequency output power when the physical characteristic data exceeds the preset range, wherein when the physical characteristic data is greater than the maximum value of the preset range or less than the minimum value of the preset range, it is determined to exceed the preset range; and
   selecting target values from various temperature values or impedance values to update the maximum value and minimum value of the preset range according to the physical characteristic data detected in real time in a preset period of time before a present moment and a default selection algorithm when the physical characteristic data does not exceed the preset range.

2. The method according to claim 1, wherein the step of adjusting a radio frequency output power when the physical characteristic data exceeds the preset range comprises steps of:
   reducing the radio frequency output power to a preset first target power when the temperature or the impedance of the object detected in real time is greater than the maximum value of the preset range; and
   increasing the radio frequency output power to a preset second target power when the temperature and the impedance of the object detected in real time are both less than the minimum value of the preset range.

3. The method according to claim 1, wherein when a radio frequency probe of a radio frequency host is a multi-electrode radio frequency probe, the step of adjusting a radio frequency output power when the physical characteristic data exceeds the preset range comprises steps of:
   determining a total power needed to be set according to a minimum impedance of an electrode of the multi-electrode radio frequency probe when the temperature or the impedance of the object detected in real time is greater than the maximum value of the preset range;
   detecting a real-time total power of the radio frequency probe of the radio frequency host, calculating a power adjustment amount by a default proportional integral differential algorithm according to the total power needed to be set and the real-time total power, and calculating a target power according to power adjustment and a present output power of the radio frequency signal; and
   reducing the radio frequency output power to the target power.

4. The method according to claim 1, wherein the step of acquiring set power data corresponding to the radio frequency operation comprises steps of:
   acquiring historical radio frequency operation data corresponding to a task and object of the radio frequency operation; and
   determining the output power of the radio frequency signal in the historical radio frequency operation data as the set power data, wherein the set power data is a change trend curve representing a corresponding relationship between the radio frequency operation time and the output power.

5. The method according to claim 4, wherein the step of setting an output power of a radio frequency signal according to the set power data comprises:
   acquiring the output power in an operation time corresponding to a current stage of a current radio frequency operation from the change trend curve, and setting the acquired output power as the output power of the radio frequency signal.

6. The method according to claim 1, wherein the step of acquiring set power data corresponding to the radio frequency operation comprises:
   acquiring the set power data from an externally connected removable storage, or acquiring the set power data inputted from an input device, wherein the set power data is a numerical interval including a maximum value of the set power and a minimum value of the set power.

7. A radio frequency host, comprising:
   a storage and a processor, wherein
   the storage stores an executable program code; and
   the processor is coupled to the storage, and configured to call the executable program code stored in the storage, and implement the data adjustment method in a radio frequency operation according to claim 1.

8. The method according to claim 1, wherein the step of selecting target values from various temperature values or impedance values to update the maximum value and minimum value of the preset range according to the physical characteristic data detected in real time in a preset period of time before a present moment and a default selection algorithm when the physical characteristic data does not exceed the preset range comprises:
   selecting a minimum value among various temperature values or impedance values in the preset period of time before the present moment as the minimum value of the preset value;
   and selecting a maximum value among the various temperature values or impedance values in the preset period of time before the present moment as the the maximum value of the preset value.

9. The method according to claim 1, wherein the step of selecting target values from various temperature values or impedance values to update the maximum value and minimum value of the preset range according to the physical characteristic data detected in real time in a preset period of time before a present moment and a default selection algorithm when the physical characteristic data does not exceed the preset range comprises:

calculating a median value of various temperature values or impedance values in the preset period of time before the present moment, calculating to-be-updated minimum and maximum values corresponding to the median value according to the median value with reference to a difference between the median value and the minimum and maximum values of the preset range before updating, determining calculated minimum value as the minimum value of the preset range and the calculated maximum value as the maximum value of the preset range.

10. A radio frequency host, comprising:
a storage and a processor, wherein
the storage stores an executable program code; and
the processor is coupled to the storage, and configured to call the executable program code stored in the storage, and implement the data adjustment method in a radio frequency operation according to claim 8.

11. A radio frequency host, comprising:
a storage and a processor, wherein
the storage stores an executable program code; and
the processor is coupled to the storage, and configured to call the executable program code stored in the storage, and implement the data adjustment method in a radio frequency operation according to claim 9.

12. A radio frequency host, comprising:
an acquisition module, configured to acquire set power data corresponding to a radio frequency operation;
a transmitting module, configured to set an output power of a radio frequency signal according to the set power data, and output the radio frequency signal to an object of the radio frequency operation;
a detection module, configured to detect physical characteristic data of the object in real time, and determine whether the physical characteristic data exceeds a preset range that is a numerical interval defined by a minimum value and a maximum value by comparing the physical characteristic data with both the minimum value and the maximum value, wherein the physical characteristic data comprises a temperature and/or an impedance of the object; and
an adjustment module, configured to adjust a radio frequency output power when the physical characteristic data exceeds the preset range, wherein when the physical characteristic data is greater than the maximum value of the preset range or less than the minimum value of the preset range, it is determined to exceed the preset range, and
select target values from various temperature values or impedance values to update the maximum value and minimum value of the preset range according to the physical characteristic data detected in real time in a preset period of time before a present moment and a default selection algorithm when the physical characteristic data does not exceed the preset range.

13. The radio frequency host according to claim 12, wherein the adjustment module is configured to select a minimum value among various temperature values or impedance values in the preset period of time before the present moment as the minimum value of the preset value; and select a maximum value among the various temperature values or impedance values in the preset period of time before the present moment as the the maximum value of the preset value.

14. The radio frequency host according to claim 12, wherein the adjustment module is configured to calculate a median value of various temperature values or impedance values in the preset period of time before the present moment, calculate to-be-updated minimum and maximum values corresponding to the median value according to the median value with reference to a difference between the median value and the minimum and maximum values of the preset range before updating, and determine calculated minimum value as the minimum value of the preset range and calculated maximum value as the maximum value of the preset range.

* * * * *